United States Patent Office 3,404,673
Patented Oct. 8, 1968

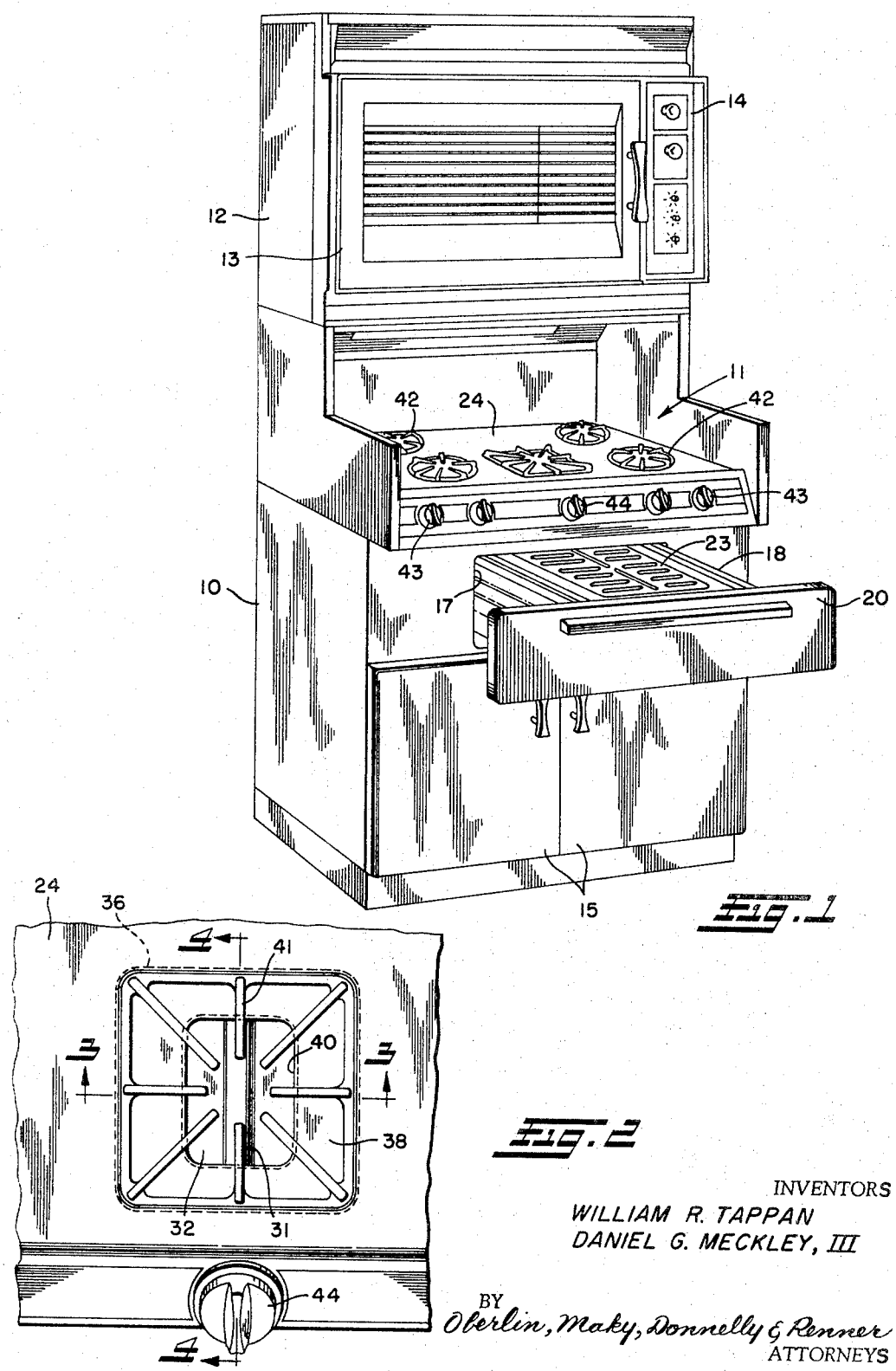

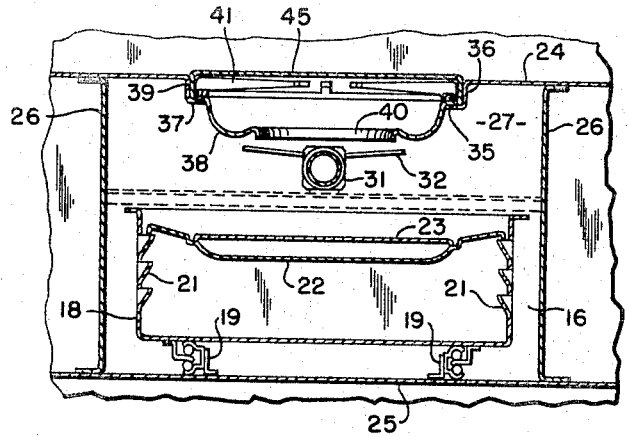
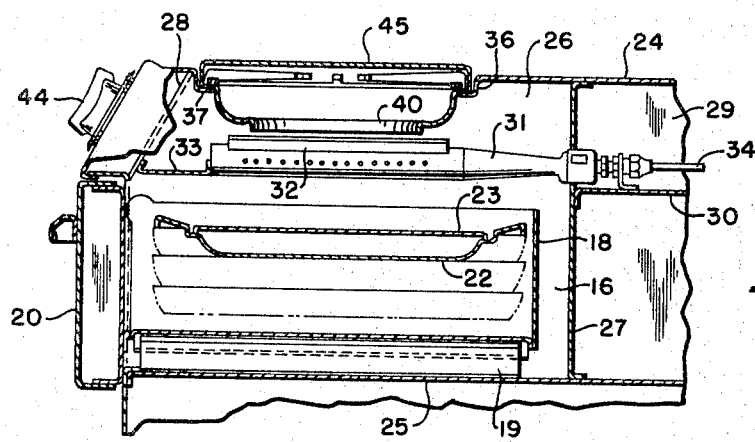
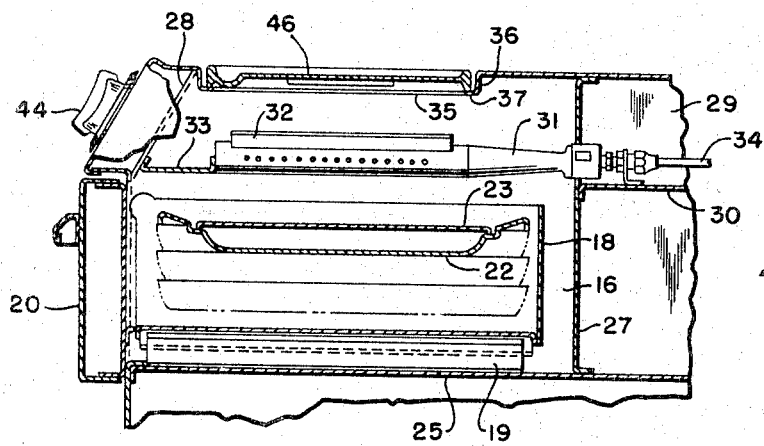

3,404,673
STOVE WITH WAIST-HIGH BROILER
William R. Tappan, Perrysville, and Daniel G. Meckley III, Mansfield, Ohio, assignors to The Tappan Company, Mansfield, Ohio, a corporation of Ohio
Filed May 4, 1967, Ser. No. 636,038
1 Claim. (Cl. 126—39)

ABSTRACT OF THE DISCLOSURE

A gas cooking stove having a base cabinet section in the upper portion of which, at approximate waist height, there is a broiler compartment, with a cooking top assembly supported on the base section and including a plurality of burners one of which functions both as a surface burner and as a broiler burner for such compartment. The other burners of the cook top are conventional surface burners, and the stove is completed by an upper oven section spaced from the cook top and approximately at eye level.

---

This invention relates as indicated to a cooking stove or range in which there is a relatively elevated special broiler assembly for use approximately at waist height.

It is a primary object of the invention to provide a novel combination cooking top and broiler in which the latter is in direct operative association with the top structure, with the top intended for installation at counter height in a kitchen and the broiler compartment immediately therebeneath. The cooking top here referred to will be understood to comprise basically a box form housing or housing section containing a plurality of heaters and regulatory controls therefor to heat the contents of utensils and the like placed in register with the heat sources on the top.

Another object is to provide such a combination cooking top and broiler including heating means, preferably a gas burner, of such construction and arrangement as to serve both as the broiler heat source and as a surface heater of the cooking top.

It is an additional object of the invention to provide a cooking stove in which such combination cooking top and broiler is incorporated in association with floor cabinet structure and a superimpsed bake oven section projecting partially over the cooking top in spaced relation and approximately at eye-level.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

FIG. 1 is a perspective view of a gas stove in accordance with the present improvements;

FIG. 2 is a fragmentary plan view of a portion of the cooking top of such stove on an enlarged scale;

FIG. 3 is a first partial vertical section of such portion of the stove as shown by the line 3—3 in FIG. 2;

FIG. 4 is a second sectional view of such portion at the plane indicated by the line 4—4 in FIG. 2; and FIG. 5 is a view similar to FIG. 4 but showing a partial structural modification of the assembly.

Referring now to the drawings in detail, the preferred gas stove embodiment illustrated is of free-standing eye-level oven type and thus comprises basically a cabinet 10, a cooking top assembly 11 as the upper portion of the cabinet at approximate counter height, and an upper oven section 12. This general configuration is now well-known, with the oven in particular, conventionally equipped with a door 13 and a control section 14 at which knobs and the like are accessible for determining the operation of the oven by means of standard controls.

It will also be understood that this oven will be equipped with bottom located burner means, not shown, in the usual manner of a gas oven for performing baking and roasting operations.

The base cabinet 10 of the stove is shown with a pair of lower doors 15 for access to the interior if desired, for example, for utensil storage and the like. The upper section of the cabinet contains a broiler compartment 16 having a front opening 17 and receiving a drawer body 18 slidably supported on tracks 19. The drawer body is provided with a hollow front door 20, which may if desired be of drop-down or bottom hinged type, and the door and compartment will ordinarily be provided with appropriate thermal insulation. The sides of the body are formed with glides 21 for support of a broiler pan 22 and a usual pan insert 23 therein at varying elevations.

The surface cooking assembly 11 of the stove comprises a main top 24 which in part defines the broiler compartment 16, the latter being further defined by a base or bottom wall 25, side liners 26, rear liner 27 and a portion of the inclined front wall 28 of the top burner box 29. These liners will be seen to extend from the base to the main top, with the bottom 30 of the burner box which occurs intermediate the main top and base provided with an opening for such arrangement.

The broiler compartment is located at the forward central portion of the stove and, being of greater height than the depth of the cooking top burner box, is thus common to the latter and the upper part of the lower base cabinet 10. An elongated gas burner 31, preferably with a top baffle 32, is mounted in the compartment 16 by the rear liner 27 and a front bracket 33 to extend horizontally above the drawer 18 at an elevation which is shown as being slightly above the plane of the bottom 30 of the burner box. The burner 31 extends through the rear liner into the box 29, with a connected line 34 for delivery of the gaseous fuel in the usual manner.

The portion of the main top 24 which extends over the burner 31 is provided with an opening 35 bounded by a short vertical wall 36 extending downwardly and terminating in an inwardly directed support flange 37. A dished burner combustion pan 38 is removably supported in this opening by having a peripheral flange 39 resting on the support flange 37 and, with the elongate form of the burner shown, the pan has a rectangular bottom opening 40 in corresponding orientation. A grate 41 is also supported in the main top opening 35 and extends over the combustion pan for the usual support of pots and other utensils.

The burner 31 accordingly is both a top or surface burner and a broiler burner. The stove has a plurality of other top burners at additional openings in the main top 24 where the further grates 42 are shown, but these are entirely conventional and need not be described in detail. The front control knobs 43 are operatively associated respectively with such other burners, and the further knob 44 represents the control for the combination top and broiler burner 31. The control of the last burner will preferably provide at least two different rates of combustion depending upon whether the burner is utilized for broiling or as a top heater, with the lower rate for the broiler, and the simplest way in which to accomplish this setting would of course be by use of a two-position selector valve.

In FIGS. 3 and 4, the additional top opening 35 is shown further as provided with a removable cover 45 which is imperforate and serves when in place to close and obscure the opening, for example, when the broiler is in use. This opening can also be closed by a grill plate 46 shown in FIG. 5 as replacing the combustion pan 38 and grate 41. Such grill plate can be of cast aluminum, and the modification is one of course that can be used alternatively with, rather than to the exclusion of, the pan and grate assembly.

The broiler can also readily be equipped with a vent should it be desired to direct the vapors and combustion products to another area for discharge when broiling. Such remote exhaust could, for example, comprise simply a flue extending over the burner and having a damper or slide arrangement effectively to interpose the flue between the burner 31 and the top opening 35 when broiling and to withdraw it to a non-obstructing position when the burner is to function as the top heater.

The complete gas stove will accordingly be seen to provide a single large oven for baking and roasting conveniently at eye level, the usual cooking surface at approximate counter height, the also very convenient waist-high broiler, and an added top heater without a separate added burner. The broiler is relatively shallow and the partial inclusion in the cooking top box as disclosed places the broiler drawer substantially immediately beneath the main cook top.

Other modes of applying the principle of the invention may be employed, change being made as regards the details described, provided the features stated in the following claim or the equivalent of such be employed.

We, therefore, particularly point out and distinctly claim as our invention:

1. In a kitchen range having a main cooking top provided with a plurality of surface heating assemblies and a baking oven supported above said main top in spaced relation and approximately at eye level, the invention comprising a cooking assembly for installation in said range approximately at waist height, said cooking assembly comprising enclosure means including top, side and bottom wall sections forming a compartment having an access opening in the lower front portion thereof, heating means fixedly supported in said compartment at an intermediate elevation approximately at the top of said lower front portion coincident with said front access opening, the upper portion of the compartment above the heating means being relatively shallow, said top wall section of said compartment being provided with an opening above said heating means at such vertical spacing therefrom that the heating means serves as a surface heater in the assembly at such top opening, means associated with the top opening for support of articles thus to be heated, a broiler drawer mounted for sliding movement within said lower portion of said compartment for supporting food articles beneath said heating means in exposure thereto for broiling and the like, said broiler drawer including door means for closing said access opening when said drawer is positioned fully within said enclosure, and control means for regulating the output of said heating means for effecting selectively the broiling or surface cooking operation.

References Cited

UNITED STATES PATENTS

| | | | |
|---|---|---|---|
| 1,038,253 | 9/1912 | Williams | 126—41 |
| 2,116,854 | 5/1938 | Teller et al. | 126—41 |
| 2,682,263 | 6/1954 | Brodbeck | 126—41 |
| 3,259,121 | 7/1966 | McGee | 126—39 |

FREDERICK L. MATTESON, JR., *Primary Examiner.*

E. G. FAVORS, *Assistant Examiner.*